United States Patent [19]
Katsuta

[11] Patent Number: 5,546,566
[45] Date of Patent: Aug. 13, 1996

[54] EMULATION SYSTEM FOR MICROCOMPUTER

[75] Inventor: Hiroshi Katsuta, Tokyo, Japan

[73] Assignee: NEC Corporation, Tokyo, Japan

[21] Appl. No.: 271,506

[22] Filed: Jul. 7, 1994

[30] Foreign Application Priority Data

Jul. 7, 1993 [JP] Japan .................................... 5-191790

[51] Int. Cl.$^6$ ..................................................... G06F 9/455
[52] U.S. Cl. ............................................................. 395/500
[58] Field of Search ..................................... 395/500, 800; 364/200, 488, 489, 490, 491, 578; 371/25

[56] References Cited

U.S. PATENT DOCUMENTS

| | | | |
|---|---|---|---|
| 4,527,234 | 7/1985 | Bellay | 364/200 |
| 4,674,089 | 6/1987 | Poret et al. | 371/25 |
| 5,062,034 | 10/1991 | Bakker | 364/200 |
| 5,101,498 | 3/1992 | Ehlig et al. | 395/800 |
| 5,331,571 | 7/1994 | Aronoff et al. | 364/490 |
| 5,339,262 | 8/1994 | Rostoker et al. | 364/578 |
| 5,432,708 | 7/1995 | Mohsen | 364/490 |

FOREIGN PATENT DOCUMENTS

| | | |
|---|---|---|
| 2691817A1 | 12/1993 | France . |
| 2696561A1 | 4/1994 | France . |
| 358141 | 3/1991 | Japan . |

OTHER PUBLICATIONS

European Search Report EP 94 11 0607, dated Sep. 28, 1994.
"In Circuit–Emulation in ASIC Architectural Core Designs", by D. Pasternak and T. Hike, IEEE, CH1234–5/89/0000, 1989, pp. 6-4.1– 6-4.4.
"Computer–Aided Prototyping for ASIC–Based Systems", by S. Walters, IEEE Design and Test of Computers, 0740–7475/91/0006, 1991, pp. 4–10.
"High–Level Synthesis applied to an ASIC Emulation Board", by N. Wehn et al., IEEE, 0–8186–2845–6/92, 1992, pp. 59–64.
"High–Level Synthesis in a Rapid Prototype Environment for Mechatronic System", by N. Wehn et al., IEEE, 0–8186–2780–8/92, 1992, pp. 188–193.
"A Validation Strategy for Embedded Core ASICS", by R. Hasslen and N. Zafar, IEEE, TH303–8/90/0000, 1990, pp. 5–3.1 –5–3.2.
"Logic Cell Emulation for ASIC In–Circuit Emulators", by S. Cravatta, IEEE, TH303–8/90/0000, 1990, pp. 5–2.1–5–2.4.

*Primary Examiner*—Kevin Teska
*Assistant Examiner*—Russell W. Frejd
*Attorney, Agent, or Firm*—Whitham, Curtis, Whitham & McGinn

[57] ABSTRACT

An emulation system for emulating an application specific integrated circuit (ASIC) type microcomputer including a central processing unit, a user specific peripheral function unit and a user specific logic circuit, which are integrated together on a single chip. The emulation system includes a first integrated circuit for emulating the central processing unit, and second and third integrated circuits each of which comprises the ASIC-type microcomputer. Each of the second and third integrated circuits can selectively operate in a first evaluation chip mode in which the central processing unit and the user specific logic circuit are isolated from an internal bus, and in a second evaluation chip mode in which the central processing unit and the user specific peripheral function unit are isolated from the internal bus. The first integrated circuit is connected through an peripheral bus to the internal bus of each of the second and third integrated circuits. The second integrated circuit is put in the first evaluation chip mode for emulating the peripheral function unit, and the third integrated circuit is put in the second evaluation chip mode for emulating the logic circuit.

10 Claims, 4 Drawing Sheets

EMULATION SYSTEM FOR MICROCOMPUTER

BACKGROUND OF THE INVENTION

1. Field of the Invention

The present invention relates to an emulation system, and more specifically to a microcomputer emulation system which makes it easy to construct an emulation chip set.

2. Description of Related Art

At present, demands for microcomputer-applied electronic instruments including home electronic instruments and office automation instruments are increasing. These electronic instruments are rapidly becoming high performance and high function, and also remarkable in versatility. As a result, it has become necessary that microcomputers have a specification specialized to each of makers of the electronic instruments and further specialized to each of the electronic instruments themselves.

On the other hand, competition among makers becomes fierce. Therefore, in order to shorten a turn-around time (TAT) in product development, a development tool including a microcomputer emulation system for assisting development and debugging of user's programs has become important in the process of developing a microcomputer-applied system.

At present, microcomputers specialized to application fields and/or application systems are mainly comprised of an ASIC (application specific integrated circuit) microcomputer in which a high performance CPU is integrated as a core element on a single chip together with various peripheral function units suitable or specialized to a maker or user.

In the prior art, therefore, the above mentioned microcomputer emulation system has been developed, for each developed microcomputer, together with a special evaluation chip which is to be provided in the emulation system and which performs the same operation as that of the developed microcomputer. Accordingly, it has been necessary to provide a similar evaluation chip for the ASIC type microcomputer.

For efficiently realizing the above mentioned demand, there has been known one method of preparing a CPU evaluation chip comprising a CPU core unit used in common to various products and a peripheral evaluation chip comprising a peripheral function unit which is different in each of products, and then providing a the chip-set structure comprised the CPU evaluation chip and the peripheral evaluation chip.

Referring to FIG. 1, there is shown one example of the above mentioned chip-set structure of the emulation system. The shown emulation system is generally designated with Reference Numeral 100, and comprises a CPU evaluation chip 101 including therein a CPU 104A. This CPU 104A performs the same operation as that of an internal CPU included in an actual developed microcomputer product, which will be called a "product chip."

The CPU evaluation chip 101 is connected through a peripheral bus 102 to a peripheral evaluation chip 103. Operation timings of the peripheral bus 102 to the peripheral evaluation chip 103 are entirely the same as those of an internal bus coupling between an internal CPU and a peripheral unit in the product chip.

The evaluation chip 103 in the example shown in FIG. 1 comprises the product chip itself. Namely, the product chip itself includes an internal CPU 104B and a peripheral function unit 105 included in the peripheral evaluation chip 103. The product chip has two kinds of operation mode, namely, an operation mode of the product chip itself and an evaluation operation mode.

In the product chip operation mode, the CPU 104B is coupled through an internal bus 106 to the peripheral unit 105 as shown by the ghost line in FIG. 1, so that a normal operation is performed. In the evaluation operation mode, on the other hand, the CPU 104B is electrically isolated from the internal bus 106, and a portion of the internal bus 106 is coupled to the peripheral bus 102.

The product chip operation mode and the evaluation operation mode of the product chip are alternatively designated through a mode designation terminal 107. For example, if the mode designation terminal 107 is set to a logic value "0" connected to ground, the product chip operation mode is designated. If the mode designation terminal 107 is set to a logic value "1" connected to a voltage supply voltage, the evaluation operation mode is designated. The evaluation chip 103 shown in FIG. 1 is in the evaluation operation mode.

In the evaluation operation mode, various controls (including a data read/write control) to the peripheral function unit are emulated in the emulation system by accessing through the peripheral bus 102 and the internal bus 106 to the peripheral function unit 105 internally provided in the peripheral evaluation chip 103, under instruction execution of the CPU 104A in the CPU evaluation chip 101.

Here, connection and access to an external memory and an I/O device, which are not shown, are performed through a system bus 108 provided to the CPU evaluation chip 101. Terminal function corresponding to the peripheral function unit 105 is realized by a peripheral function signal 109 of the peripheral evaluation chip 103.

The system bus 108 and the peripheral function signal 109 are connected to an external device through a system bus terminal 110 and a peripheral function terminal 111 of the emulation system 100.

The peripheral evaluation chip 103 is made to cause only the peripheral function unit 105 to effectively operate for the product chip. Function of the product chip corresponding to terminals switched to the peripheral bus 102 is substituted with functions provided in the CPU evaluation chip 101.

In the chip-set structure of emulation system 100, it is sufficient if only a product chip is developed for each application. Namely, it is unnecessary to develop a specialized evaluation chip for each application. Accordingly, it is advantageous in that an effective development environment is given to users.

Lastly, however, rapid advance of semiconductor manufacturing techniques is making it possible to utilize a 0.5 μm process, and therefore, it is becoming possible that a user specific logic circuit on the scale of several thousand to several ten thousand gates, which had been manufactured on a separate substrate, are integrated together with a microcomputer on a single ship.

One example of this type microcomputer is proposed in Japanese Patent Application Laid-open Publication No. JP-A-03-058141, which discloses an integrated circuit with a user's logic. This integrated circuit can be independently connected to respective external terminals, when an additional user's logic circuit is connected to the existing microcomputer.

Here, the user specific logic circuit has an extremely high level of versatility in comparison with the peripheral function units of the conventional ASIC microcomputers, so that it can be different not only from one user to another, but also from one instrument to another. However, how to construct an emulation system for emulating this integrated circuit with the user's logic has become a problem.

In order to overcome this problem, there has been proposed to prepare a gate array of PLD (programmable logic device) which operates equivalently with a user specific logic circuit, and to combine the gate array or PLD with a conventional emulation system.

Referring to FIG. 2, there is shown a block diagram of an emulation system 200 constructed by adding a gate array 201 for a user specific logic circuit, to the emulation system 100 shown in FIG. 1. In the emulation system 200 shown in FIG. 2, therefore, the gate array 201 is newly developed independently of the product chip, and is required to be developed for each user and for each instrument, so as to correspond to a user specific logic circuit included in the product chip.

The gate array 201 is connected to the CPU evaluation chip 101 through the system bus 108, so that various controls (including the data read/write control) to internal hardware are performed by instruction execution of the CPU.

An internal circuit of the gate array 201 is constructed to be able to perform an operation equivalent to that of the user logic internally contained in the product chip. In addition, a user logic terminal 203 is provided for inputting and outputting a user logic signal to and from the gate array 201, so that the functions corresponding to the user logic circuit included in the product chip are emulated.

As mentioned above, for emulation of the microcomputer having the CPU and the user specific logic circuit integrated together on a single chip, the conventional emulation system has required to newly prepare a gate array corresponding to the user specific logic circuit.

Therefore, at each time a microcomputer is newly developed, it was necessary to develop a special gate array corresponding to the user specific logic circuit newly added to the developed microcomputer. Accordingly, the development steps and cost for design, manufacturing and evaluation of the special gate array have been required. This problem is an important problem to be solved for microcomputer developers and manufacturers and also for users of microcomputers or microcomputer development orderers.

In general, it is very difficult to make a circuit realized on a gate array completely consistent with another circuit formed on a single chip microcomputer, in physical locations and wiring patterns of transistors, although these circuits have the same logical circuit construction. In addition, it is substantially impossible to cause these circuits to operate in the same electrical conditions including input/output of signals terminals. As a result, the conventional emulation system cannot give a completely satisfactory emulation environment.

SUMMARY OF THE INVENTION

Accordingly, it is an object of the present invention to provide an emulation system which has overcome the above mentioned defect of the conventional emulation system.

Another object of the present invention is to provide an emulation system capable of giving a completely satisfactory emulation environment, with no special gate array, by efficiently utilizing hardware resources.

A further object of the present invention is to provide an inexpensive emulation system having a high level of utility and capable of giving a completely satisfactory emulation environment, with no special gate array, by efficiently utilizing hardware resources.

The above and other objects of the present invention are achieved in accordance with the present invention by an emulation system for emulating a microcomputer which includes a central processing unit, a peripheral function unit and a user specific logic circuit, which are integrated together on a single chip, the system including a first integrated circuit for emulating the central processing unit, a second integrated circuit operating in a first operation mode for emulating the peripheral function unit, and a third integrated circuit operating in a second operation mode for emulating the logic circuit, the first, second and third integrated circuits being interconnected, and each of the second and third integrated circuits having a mode designating means for switching between the first operation mode and the second operation mode.

In one embodiment of the emulation system, the mode designating means includes at least one mode designation terminal for designating the operation mode from an external.

Specifically, each of the second and third integrated circuits includes the same central processing unit, the same peripheral function unit and the same specific logic circuit as corresponding ones of the microcomputer. Each of the second and third integrated circuits is such that, when it is in the first operation mode, the central processing unit and the specific logic circuit are electrically isolated from an internal bus, and when it is in the second operation mode, the central processing unit and the peripheral function unit are electrically isolated from the internal bus.

Furthermore, each of the second and third integrated circuits can have a third operation mode in which the central processing unit, the peripheral function unit and the specific logic circuit are electrically connected to the internal bus.

The above and other objects, features and advantages of the present invention will be apparent from the following description of preferred embodiments of the invention with reference to the accompanying drawings.

DESCRIPTION OF THE PREFERRED EMBODIMENTS

Figure 1:
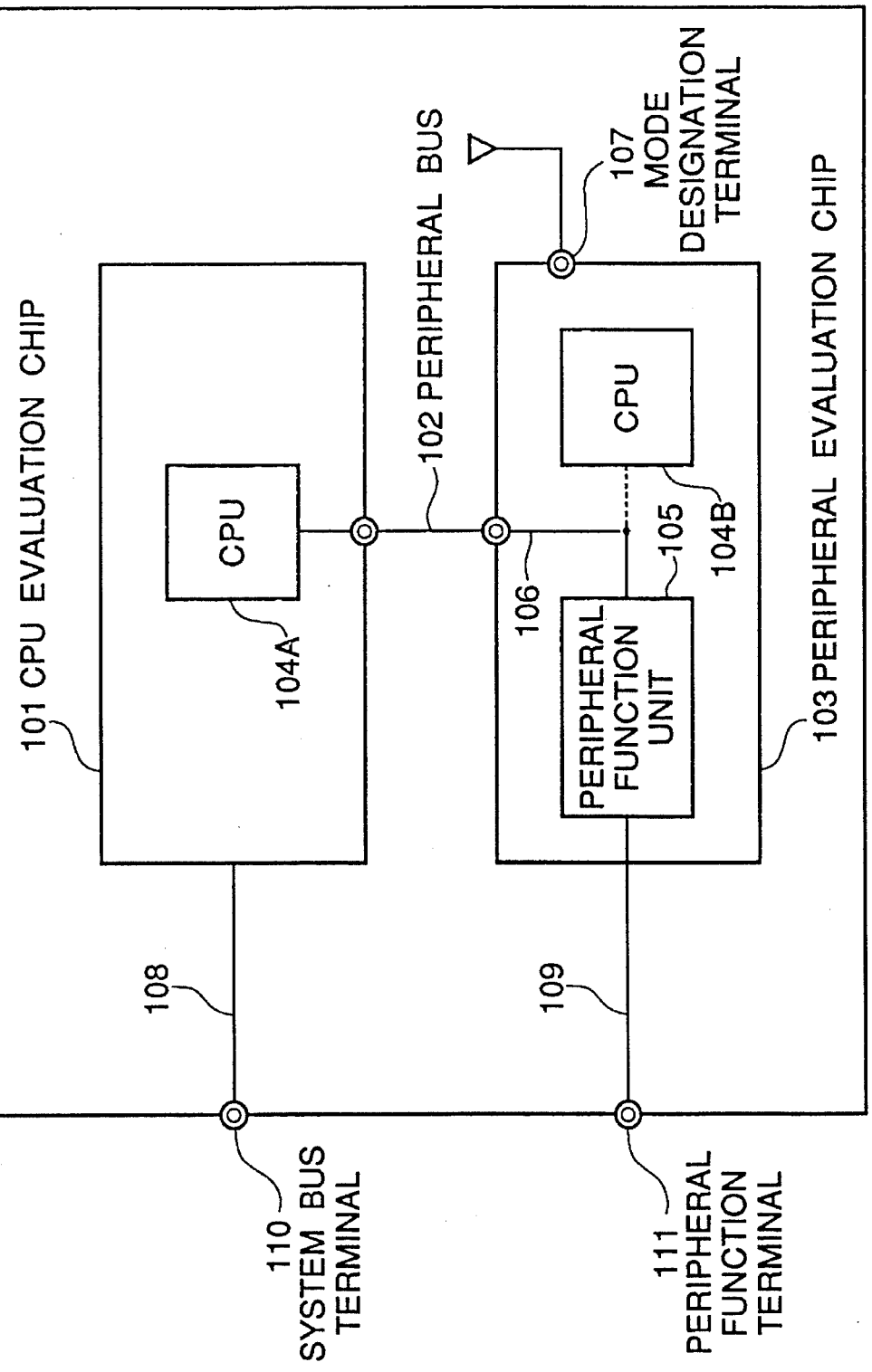
FIG. 1 is a block diagram of one example of the conventional emulation system.
Figure 2:
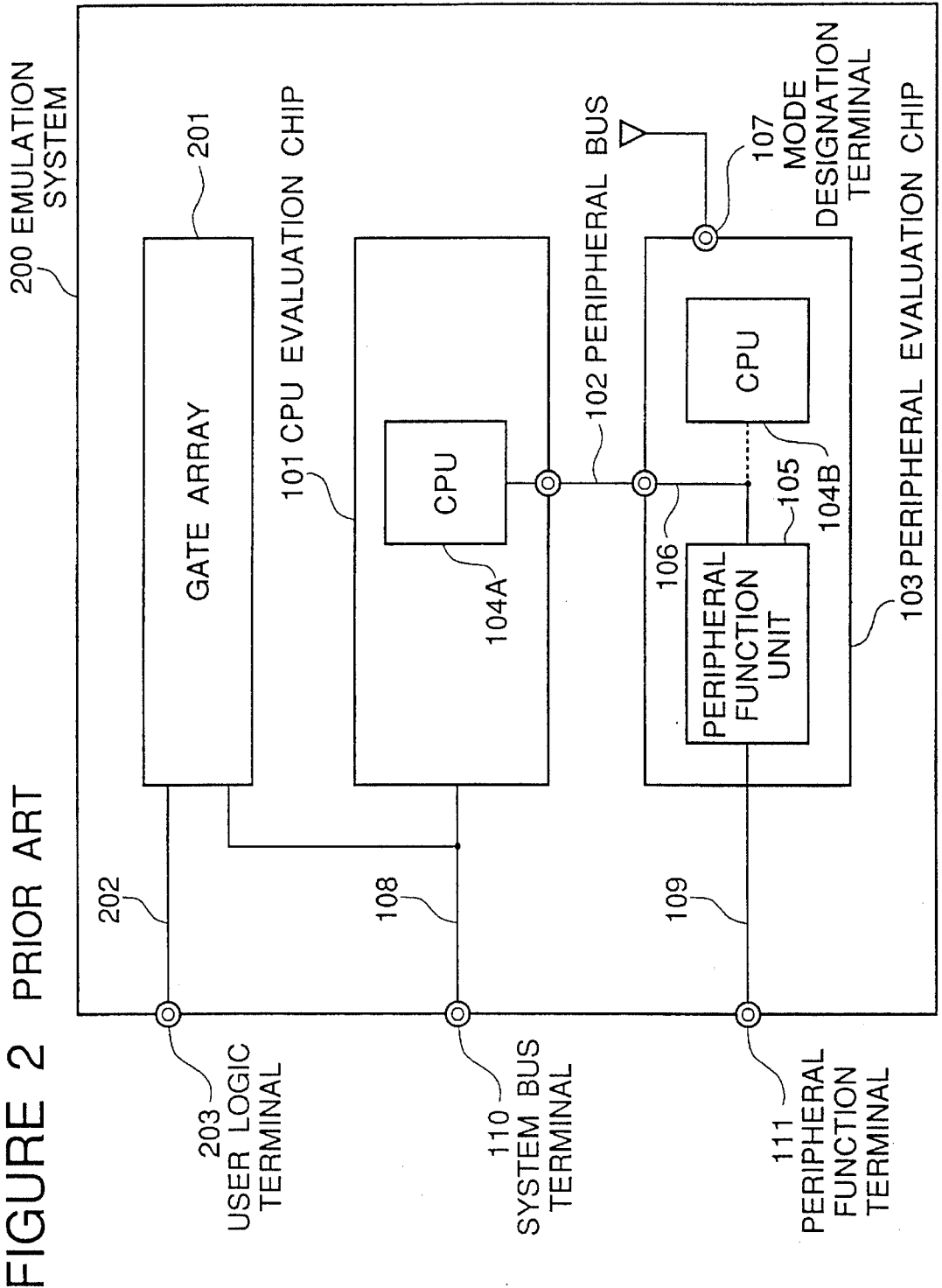
FIG. 2 is a block diagram of another example of the conventional emulation system.
Figure 3:
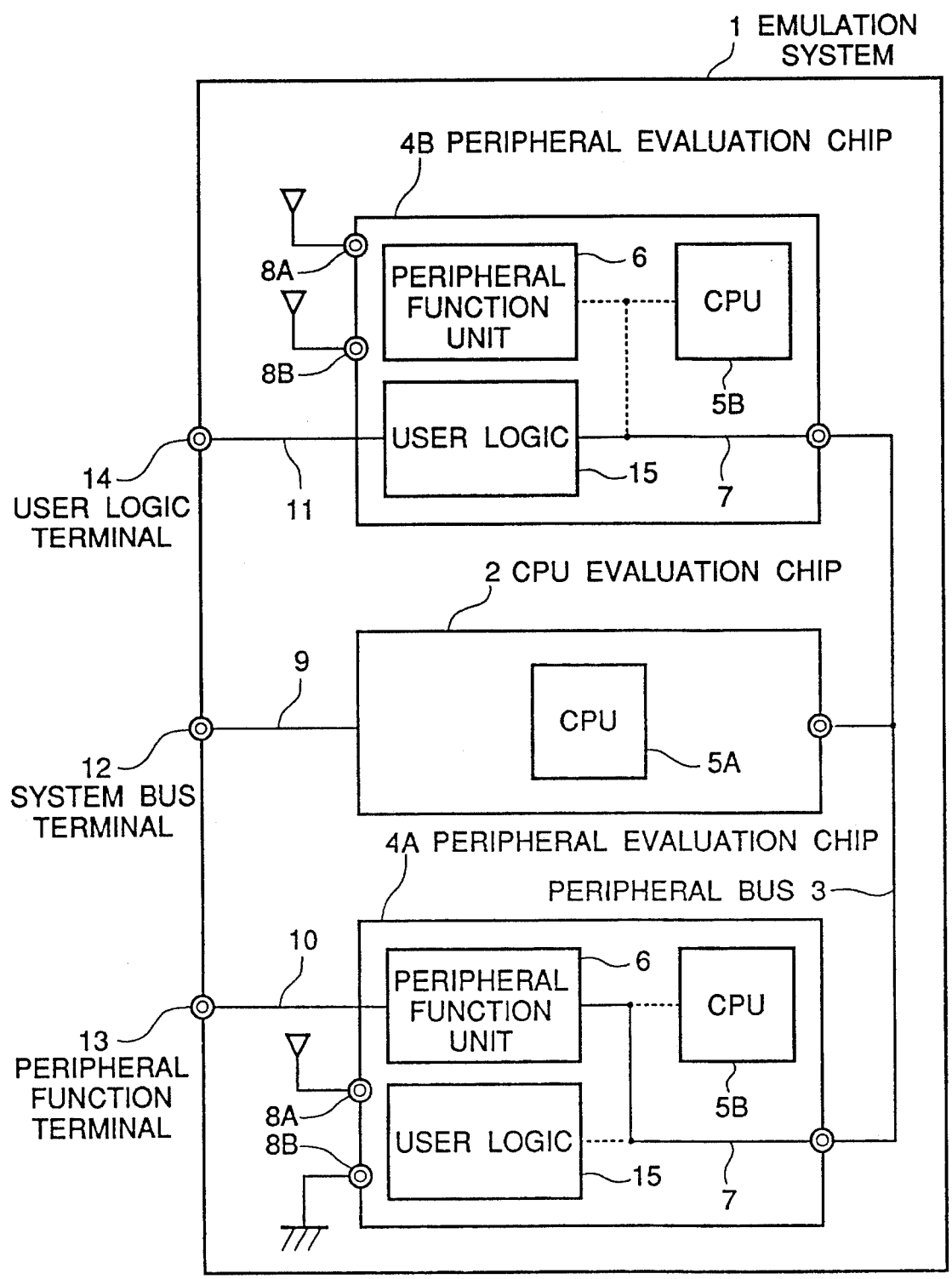
FIG. 3 is a block diagram of one embodiment of the emulation system in accordance with the present invention.

Referring to FIG. 3, there is shown a block diagram of one embodiment of the emulation system in accordance with the present invention.

The shown emulation system, generally designated with Reference Numeral 1, includes a CPU evaluation chip 2, and two peripheral evaluation chips 4A and 4B.

The CPU evaluation chip 2 internally contains a CPU 5A, which performs the same operation as that of an actual developed microcomputer product, namely a product chip. The CPU evaluation chip 2 is connected through a peripheral bus 3 to the peripheral evaluation chips 4A and 4B, respectively. Operating timing of the peripheral bus 3 to the peripheral evaluation chips 4A and 4B are entirely the same as those of an internal bus interconnecting between an internal CPU and a peripheral function unit in the product chip.

In the shown embodiment, each of the peripheral evaluation chips 4A and 4B comprises the product chip. The product chip includes an internal CPU 5B, a peripheral function unit 6 and a user logic 15 which are integrated on a single chip, and has three operation modes, namely, a product chip operation mode, a peripheral function evaluation mode and a user logic evaluation mode. These operations modes are alternatively designated through two mode terminals 8A and 8B by selectively connecting these mode terminals to a voltage supply voltage (VCC) and ground (GND) as shown in the following TABLE 1:

TABLE 1

| MODE TERMINAL | | |
|---|---|---|
| 8A | 8B | OPERATION MODE |
| GND | GND | PRODUCT CHIP OPERATION MODE |
| GND | VCC | (NO SETING) |
| VCC | GND | PERRPHERAL FUNCTION EVALUATION MODE |
| VCC | VCC | USER LOGIC EVALUATION MODE |

Figure 4:
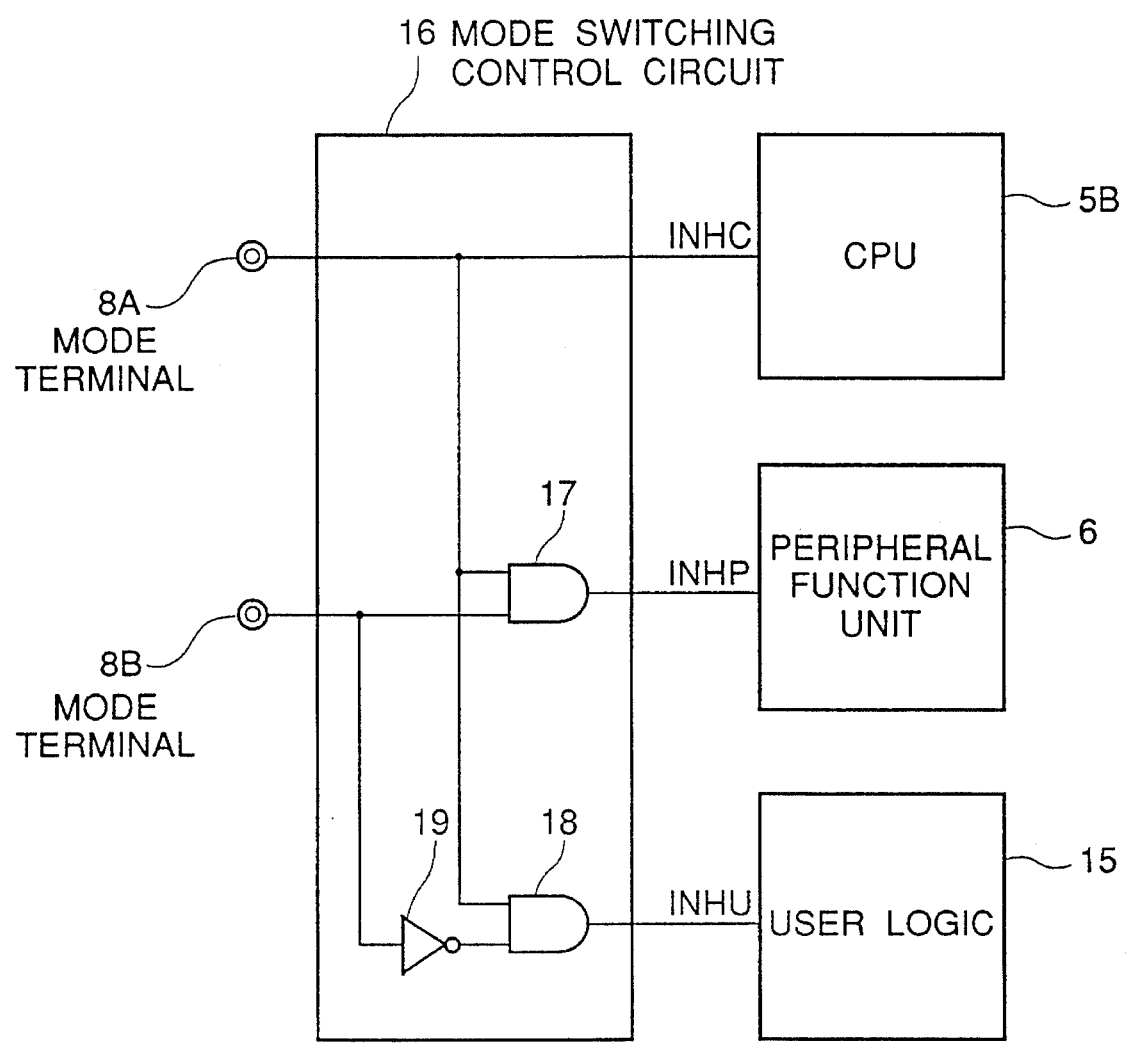
FIG. 4 is a logic circuit diagram of the mode switching control circuit incorporated in the system shown in FIG. 3.

Referring to FIG. 4, there is shown a mode switching logic circuit used in each of the peripheral evaluation chips 4A and 4B. A mode switching logic circuit, generally designated with Reference Numeral 16, includes an AND gate 17 having a pair of inputs connected to the mode terminals 8A and 8B, respectively, an inverter 19 having an input connected to the mode terminal 8B, and another AND gate 18 having a pair of inputs connected to the mode terminal 8A and an output of the inverter 19, respectively. The mode terminal 8A is connected to the CPU 5B as a mode control signal INHC, and an output of the AND gate 17 is connected to the peripheral function unit 6 as a mode control signal INHP. An output of the AND gate 18 is connected to the user logic 15 as a mode control signal INHU. These mode control signals are generated by connecting the mode terminals 8A and 8B to the voltage supply voltage (VCC) and ground (GND), as shown in the following TABLE 2:

TABLE 2

| MODE TERMINAL | | MODE CONTROL SIGNAL | | |
|---|---|---|---|---|
| 8A | 8B | INHC | INHP | INHU |
| GND | GND | 0 | 0 | 0 |
| GND | VCC | 0 | 0 | 0 |
| VCC | GND | 1 | 0 | 1 |
| VCC | VCC | 1 | 1 | 0 |

When the mode control signal INHC is at a logic value "1", the CPU 5B is brought into an operation inhibited condition, and therefore does not drive the internal bus 7. When the mode control signal INHP is at a logic value "1", the peripheral function unit 6 is brought into an operation inhibited condition, and when the mode control signal INHU is at a logic value "1", the use logic 15 is brought into an operation inhibited condition.

When each of the peripheral evaluation chips 4A and 4B is in the product chip operation mode, the CPU 5B, the peripheral function unit 6 and the user logic 15 are interconnected through the internal bus 7 so as to perform a normal operation.

In the peripheral function evaluation mode, the CPU 5B and the user logic 15 are electrically isolated from the internal bus 7, and a portion of the internal bus 7 is connected to the peripheral bus 3.

In the user logic evaluation mode, the CPU 5B and the peripheral function unit 6 are electrically isolated from the internal bus 7, and a portion of the internal bus 7 is connected to the peripheral bus 3.

As explained above, the operation mode of the product chip can be alternatively designated by the mode terminals 8A and 8B. Namely, the product chip can be put in the peripheral function evaluation mode or in the user logic evaluation mode.

In the shown emulation system 1, the peripheral evaluation chip 4A is put in the peripheral function evaluation mode so that only the peripheral function unit 6 of the product chip effectively operates, and the peripheral evaluation chip 4B is put in the user logic evaluation mode so that only the user logic 15 of the product chip effectively operates.

Various controls (including data read/write control) of the CPU to the peripheral function unit 6 in the product chip, are perfectly emulated in the emulation system 1, by accessing through the peripheral bus 3 and the internal bus 7 to the peripheral functional unit 6 internally contained in the peripheral evaluation chip 4A under instruction execution of the CPU 5A in the CPU evaluation chip 2.

Furthermore, various controls (including data read/write control) of the CPU to the user logic in the product chip are perfectly emulated in the emulation system 1, by accessing through the peripheral bus 3 and the internal bus 7 to the internal user logic 15 of the peripheral evaluation chip 4B under instruction execution of the CPU 5A in the CPU evaluation chip 2.

Here, connection and access to an external memory and an I/O device, which are not shown, are performed through a system bus 9 provided to the CPU evaluation chip 2. Terminal function corresponding to the peripheral function unit 6 is realized by a peripheral function signal 10 of the peripheral evaluation chip 4A. Terminal function corresponding to the user logic 15 is realized by a user logic signal 11 of the peripheral evaluation chip 4B.

The system bus 9, the peripheral function signal 10 and the user logic signal 11 are connected to an external through a system bus terminal 12, a peripheral function terminal 13 and a user logic terminal 14 of the emulation system 1. Functions of these terminal are completely equivalent to those of the product chip. Here, function of the peripheral evaluation chips 4A and 4B, namely the product chips, corresponding to terminals switched to the peripheral bus 3 is substituted with functions provided in the CPU evaluation chip 2.

The above mentioned emulation system 1 has been configured so that the evaluation chip operation mode of the product chip is designated and switched over by the mode terminals 8A and 8B. However, the present invention is not limited to this embodiment. For example, it is possible to provide a mode register within the emulation system 1 and to change the setting of the mode register in a software manner. In addition, mode setting can be performed by a parallel signal transmission through a plurality of terminals or a serial signal transmission through only one terminal.

Furthermore, the evaluation chip operation mode is not necessarily limited to the two kinds, but can have three or more kinds by further dividing the peripheral function unit and the user logic so that the peripheral evaluation chip can ben user in three or more different operation modes.

As will be apparent from the above, in the case of emulating the ASIC microcomputer having a user specific logic circuit integrated together with a CPU and a peripheral function unit on a single chip, the emulation system in accordance with the present invention makes it unnecessary to prepare or develop a gate array corresponding to the user specific logic. Namely, since the emulation system in accordance with the present invention utilizes the product chip as the user logic evaluation chip, when a microcomputer is developed, it becomes unnecessary to develop a gate array inherent to the developed microcomputer. Accordingly, the development steps and the development cost for designing, manufacturing and evaluating the gate array and the like become unnecessary. This is a remarkable advantage.

In addition, the emulation system in accordance with the present invention can give an emulation environment which operates under perfectly the same condition as that of the product chip. Therefore, hardware resource can be efficiently utilized, and further, a perfect emulation environment can be realized. This is also a remarkable practical advantage.

The invention has thus been shown and described with reference to the specific embodiments. However, it should be noted that the present invention is in no way limited to the details of the illustrated structures but changes and modifications may be made within the scope of the appended claims.

I claim:

1. An emulation system for emulating a microcomputer, the microcomputer comprising a central processing unit, a peripheral function unit, and a user specific logic circuit, integrated together on a single chip, the emulation system comprising:

a first integrated circuit for emulating said central processing unit;

a second integrated circuit operating in a first operation mode for emulating said peripheral function unit; and a third integrated circuit operating in a second operation mode for emulating said user specific logic circuit, said first, second and third integrated circuits being interconnected, and each of said second and third integrated circuits having a mode designating means for switching between said first operation mode and said second operation mode.

2. An emulation system claimed in claim 1 wherein said mode designating means includes at least one mode designation terminal for designating the operation mode from an external device.

3. An emulation system claimed in claim 1 wherein each of said second and third integrated circuits comprises a same-type central processing unit, a same-type peripheral function unit and a same-type user specific logic circuit as said microcomputer, each of said second and third integrated circuits being connected such that, in said first operation mode, said central processing unit and said user specific logic circuit are electrically disconnected from an internal bus, and in said second operation mode, said central processing unit and said peripheral function unit are electrically disconnected from said internal bus.

4. An emulation system claimed in claim 3 wherein each of said second and third integrated circuits has a third operation mode wherein said central processing unit, said peripheral function unit and said user specific logic circuit are electrically connected to said internal bus.

5. An emulation system for emulating an application specific integrated circuit (ASIC)-type microcomputer, said ASIC-type microcomputer comprising a central processing unit, a user specific peripheral function unit, and a user specific logic circuit integrated together on a single chip and interconnected through an internal bus, the emulation system comprising:

a first integrated circuit for emulating said central processing unit; and second and third integrated circuits, each of said second and third integrated circuits for selectively operating in a first evaluation chip mode wherein said central processing unit and said user specific logic circuit are disconnected from said internal bus, and in a second evaluation chip mode wherein said central processing unit and said user specific peripheral function unit are disconnected from said internal bus, each of said second and third integrated circuits having a mode designating means for selecting one of said first evaluation chip mode and said second evaluation chip mode, said first integrated circuit being connected through a peripheral bus to said internal bus of each of said second and third integrated circuits, said second integrated circuit being put by said mode designating means of said second integrated circuit into said first evaluation chip mode for emulating said peripheral function unit, and said third integrated circuit being put by said mode designating means of said third integrated circuit into said second evaluation chip mode for emulating said user specific logic circuit.

6. An emulation system claimed in claim 1 wherein said mode designating means switches between said first operation mode and said second operation mode with a single serial transmission signal.

7. An emulation system claimed in claim 1 wherein said mode designating means includes at least two mode designation terminals for designating one of said first operation mode and said second operation mode from an external device.

8. An emulation system claimed in claim 7 wherein said mode designating means switches between said first operation mode and said second operation mode by parallel signal transmission through said at least two mode designation terminals.

9. An emulation system as claimed in claim 1, wherein said mode designating means comprises:

a first mode terminal;

a second mode terminal; and logic means, connected to said first mode terminal and to said second mode terminal, for selectively switching said second and third integrated circuits between said first operation mode and said second operation mode.

10. An emulation system claimed in claim 9 wherein said logic means comprises:

first, second, and third output terminals;

first and second AND-gates, said first mode terminal connected to said first output terminal, and to inputs of said first and second AND-gates; and an inverter having an output connected to an input of said second AND-gate, said second mode terminal connected to an input of said first AND-gate and to an input of said inverter, said first AND-gate connected to said second output terminal and said second AND-gate connected to said third output terminal.

* * * * *